United States Patent [19]

Shimada et al.

[11] Patent Number: 5,247,466
[45] Date of Patent: Sep. 21, 1993

[54] ANGULAR RATE DETECTION APPARATUS, ACCELERATION DETECTION APPARATUS AND MOVEMENT CONTROL APPARATUS, OF MOVING BODY

[75] Inventors: Kousaku Shimada, Katsuta; Yozo Nakamura, Chiyoda; Shigeru Horikoshi, Mito; Hayato Sugawara; Tatsuhiko Monji, both of Katsuta, all of Japan

[73] Assignees: Hitachi, Ltd., Tokyo; Hitachi Automotive Engineering Co., Ltd., Ibaraki, both of Japan

[21] Appl. No.: 674,692

[22] Filed: Mar. 25, 1991

[30] Foreign Application Priority Data

Mar. 29, 1990 [JP] Japan .................................... 2-78948

[51] Int. Cl.$^5$ ............................................. G01P 15/02
[52] U.S. Cl. ............................... 364/566; 364/424.01; 364/453; 73/517 A
[58] Field of Search .................... 364/566, 453, 424.01; 73/510-512, 517 A

[56] References Cited

U.S. PATENT DOCUMENTS

| | | | |
|---|---|---|---|
| 4,280,188 | 7/1981 | Weinstein et al. | 364/566 |
| 4,510,802 | 4/1985 | Peters | 73/505 |
| 4,794,539 | 12/1988 | Wallentowitz et al. | 364/426.01 |
| 4,807,138 | 2/1989 | Krogmann | 364/453 |
| 4,814,680 | 3/1989 | Halsing | 318/561 |
| 4,896,268 | 1/1990 | MacGugan | 364/453 |
| 4,908,767 | 3/1990 | Scholl et al. | 364/453 |

FOREIGN PATENT DOCUMENTS

| | | |
|---|---|---|
| 8702466 | 4/1987 | European Pat. Off. |
| 3545715 | 7/1987 | Fed. Rep. of Germany |

Primary Examiner—Thomas G. Black
Attorney, Agent, or Firm—Antonelli, Terry, Stout & Kraus

[57] ABSTRACT

An apparatus for detecting an angular rate of a moving body has first and second sensors each of which has a detection direction, the first and second acceleration sensors are mounted at fixed locations on a moving body so that the first and second acceleration sensors have substantially the same detection direction on a plane and a fixed distance therebetween in the detection direction, and the angular rate ($\omega$) of the moving body is detected according to the following equation:

$$\omega = \sqrt{\frac{\Delta G}{R}}$$

wherein $\Delta G$ is an acceleration difference and R is the distance between the first and second acceleration sensors in the detection direction.

15 Claims, 9 Drawing Sheets

ANGULAR RATE DETECTION APPARATUS, ACCELERATION DETECTION APPARATUS AND MOVEMENT CONTROL APPARATUS, OF MOVING BODY

BACKGROUND OF THE INVENTION

The present invention relates to apparatus for detecting an angular rate (or angular velocity) of a moving body, such as an automobile, a video camera, etc., a control apparatus for controlling movement of a moving body, such as an automobile, and an apparatus for detecting acceleration of a moving body. The apparatus for detecting an angular rate employs first and second acceleration sensors mounted on a moving body for detecting angular rate, using outputs of the first and second acceleration sensors and a positional relation between the first and second acceleration sensors.

Various methods are known of detecting an angular rate of a moving body. There are a method employing a vibration gyroscope (JP-A 64-16912), a method employing an optical fiber gyroscope (JP-A 64-1906), a method employing a gas rate sensor (JP-A 63-243763) and a method employing supersonic waves (JP-A 1-127963), for example. Further, a conventional yaw rate detection method of detecting a yaw rate of a vehicle is known, which is disclosed in JP-A 63-218866, wherein wheel velocities are used for detecting indirectly a yaw rate which is a kind of an angular rate.

Any of the above-mentioned conventional methods of detecting angular rate, except for the method in JP-A 63-218866, detect directly angular rate. These methods need complicated apparatus for practicing the methods.

Apparatus for carrying out the yaw rate detection method is simple. However, the method has a problem of detection preciseness because conditions of load surfaces and wheel rotation for detection of wheel velocity influence the yaw rate detection results.

SUMMARY OF THE INVENTION

An object of the present invention is to provide an apparatus for detecting indirectly an angular rate of a moving body, such as an automobile, employing acceleration sensors, and a control apparatus for controlling movement of a moving body by using an angular rate detected by the above-mentioned apparatus for detecting an angular rate as a feedback signal.

An apparatus for detecting an angular rate of a moving body according to the present invention, comprises first and second sensors each of which has a detection direction, means for mounting the first and second acceleration sensors on a moving body so that the first and second acceleration sensors have substantially the same detection direction on a plane and a distance therebetween in the detection direction, and means for detecting an angular rate of the moving body around an axis perpendicular to the plane on which the first and second acceleration sensors are disposed, on the basis of a positional relation between the first and second acceleration sensors and an acceleration difference between acceleration detected by the first acceleration sensor and acceleration detected by the second acceleration sensor.

According to an aspect of the present invention, the means for detecting angular rate detects an angular rate ($\omega$) of the moving body according to the following equation:

$$\omega = \sqrt{\frac{\Delta G}{R}}$$

wherein $\Delta G$ is an acceleration difference and R is the distance between the first and second acceleration sensors in the detection direction.

According to another aspect of the present invention, the apparatus comprises means for adjusting the zero point of the acceleration sensor, which means effects zero-point adjustment during stoppage of movement of the moving body.

According to another aspect of the present invention, the apparatus comprises filtering means for removing high-frequency noises on the acceleration detected by the first and second sensors.

A control apparatus for controlling movement of a moving body comprises an apparatus for detecting an angular rate of a moving body according to the present invention and an actuator for actuating a control element for controlling the movement of the moving body, referring to the detected angular rate of the movement of the moving body. An example of the movement of the moving body is the yaw of an automobile. By this control apparatus the yaw of the automobile can be suppressed.

DESCRIPTION OF THE INVENTION

Referring to the drawings, an embodiment of the present invention will be described hereunder in detail.

Figure 1:
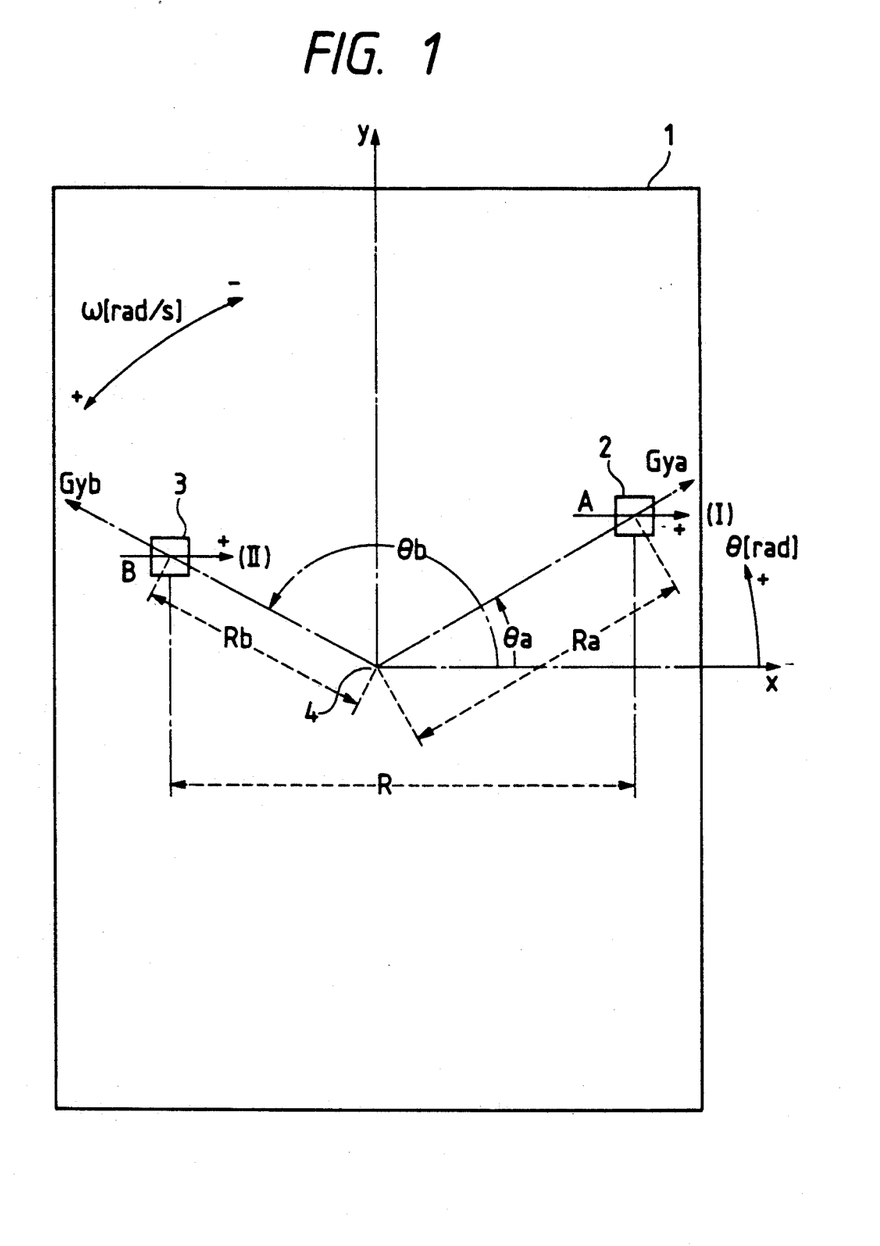
FIG. 1 is a diagrammatic view of an arrangement of acceleration sensors mounted on a moving body according to an embodiment of the present invention.

In FIG. 1, there is provided a moving body 1, the angular rate of which is to be detected. The moving body 1 can be moved on a x-y plane thereof at least, and movement thereof comprises parallel movement on the x-y plane and a rotation or revolution around an axis z perpendicular to the x-y plane. The moving body 1 moves with internal or external energy. A representative example of the moving body 1 is an automobile. A moving part of the automobile, an air plane, video camera, etc. each also are a moving body, for example. The moving body 1 shown in FIG. 1 has a rectangular shape in order to simplify an explanation of the present invention, however, the moving body 1 can have any other shape.

An apparatus for detecting angular rate of the moving body 1 comprises first and second acceleration sensors 2, 3 which have detection directions (I), (II), respectively. The first and second acceleration sensors 2, 3 are fixed to the moving body 1 at setting points A and B, respectively. Assuming that the center of gravity 4 of the moving body 1 is the center of the rotation of the moving body 1, the setting point A of the first acceleration sensor 2 is positioned at a radius $R_a$ at a right side of the gravity center 4 and the setting point B of the second acceleration sensor 3 is positioned at a radius $R_b$ at a left side. The setting points A, B have angles $\theta a$, $\theta b$ with respect to the x-axis. The detection directions (I), (II) of the acceleration sensors 2, 3 each are parallel to the x-axis.

Acceleration of the moving body 1 detected by the acceleration sensors 2, 3 is an x-component of acceleration of parallel movement of the moving body 1 and an x-component of an acceleration due to a centrifugal force caused by rotational movement of the moving body 1. Accordingly, the accelerations $G_{sa}$, $G_{sb}$ detected by the first and second acceleration sensors 2, 3 are expressed by the following equations, respectively:

$$G_{sa} = G_{la} + G_{ya} \cos \theta a \tag{1}$$

$$G_{sb} = G_{lb} + G_{yb} \cos \theta b \tag{2}$$

wherein
 $G_{la}$ is acceleration of parallel movement at the A point,
 $G_{lb}$ is acceleration of parallel movement at the B point,
 $G_{ya}$ is acceleration due to rotational movement (centrifugal force) at the A point,
 $G_{yb}$ is acceleration due to rotational movement (centrifugal force) at the P point,
 $G_{sa}$ is acceleration at the point A, really detected by the sensor 2, and
 $G_{sb}$ is acceleration at the point B, really detected by the sensor 3.

Figure 2:
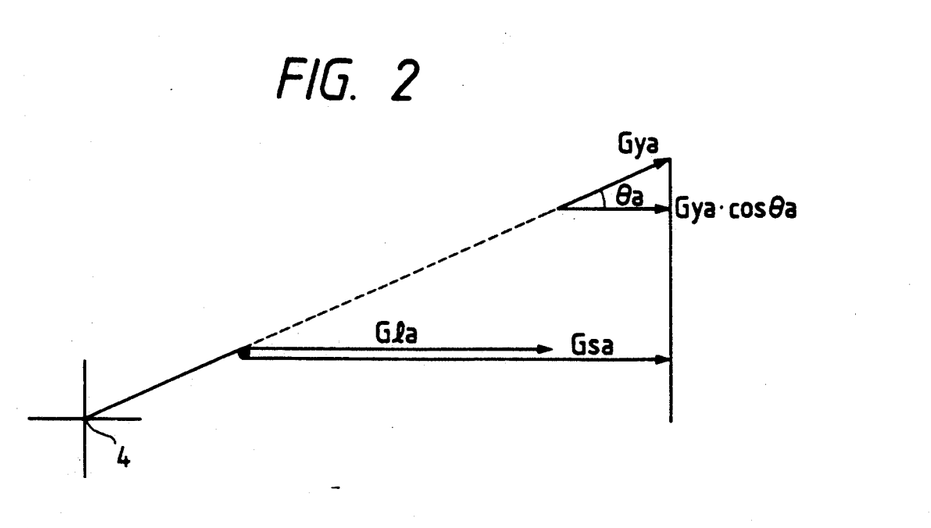
FIGS. 2 and 3 each are a vector diagram for explaining acceleration vector analysis of the embodiment of the present invention.
Figure 3:
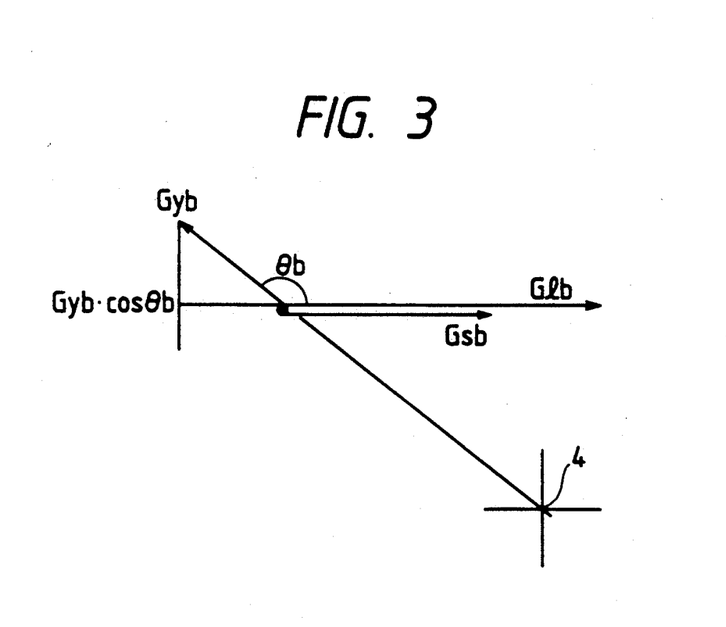

The equations (1), (2) are illustrated in FIGS. 2 and 3 to make easy understanding.

Here, as for the parallel movement acceleration $G_{la}$, $G_{lb}$, the following relation is established;

$$G_{la} = G_{lb} \tag{3}$$

A difference $\Delta G$ between detection acceleration $G_{sa}$, $G_{sb}$ at the points A, B is given as follows, employing the equations (1), (2) and (3)

$$\Delta G = G_{sa} - G_{sb} \tag{4}$$
$$= G_{ya} \cos \theta a - G_{yb} \cos \theta b$$

When the moving body rotates, centrifugal force takes place. The centrifugal force is expressed by (mass)×(radius)×(angular rate)$^2$, and acceleration due to the rotation is (radius)×(angular rate)$^2$, therefore, acceleration due to the rotation at the points A, B are expressed as follows, respectively:

$$G_{ya} = R_a \cdot \omega^2 \tag{5}$$

$$G_{yb} = R_b \cdot \omega^2 \tag{6}$$

By substituting the equations (5) and (6) into the equation (4), the equation (4) is converted as follows:

$$\Delta G = \omega^2 (R_a \cos \theta a - R_b \cos \theta b) \tag{7}$$

Both sides of the equation (7) are plus. From the equation (7), an angular rate $\omega$ is given as follows:

$$\omega = \sqrt{\frac{\Delta G}{R_a \cos \theta a - R_b \cos \theta b}} \tag{8}$$

A distance R on the x-axis between the point A and the point B is given as follows:

$$R = R_a \cos \theta a - R_b \cos \theta b \tag{9}$$

whereby the equation (8) can be expressed as follows:

$$\omega = \sqrt{\frac{\Delta G}{R}} \tag{10}$$

In the equation (8) or (10), $R_a$, $R_b$, $\theta a$ and $\theta b$ are fixed values, therefore, R also is a fixed value representing a positional relation of the first and second acceleration sensors mounted on the moving body 1. On the other hand, $\Delta G$ is a difference between the detection acceleration by the first and second acceleration sensors, so that it is found that the angular rate $\omega$ can be calculated according to the equation (8) or (10), based on the positioned relation and the detection acceleration.

The apparatus for detecting angular rate further comprises means for mounting the first and second acceleration sensors 2, 3 on the moving body 1 at a distance R therebetween as mentioned above so as to have the same detection direction, and a processing circuit for detecting the angular rate from the acceleration difference $\Delta G$ and the positional relation R according to the equation (8) or (10).

The processing circuit can be of analogue or digital type.

As for the positional relation between the first and second acceleration sensors 2, 3, the equation (9) should not be zero. If this condition is satisfied, any values of $\theta a$, $\theta b$, $R_a$, $R_b$ can be used. However, as for $\theta a$, $\theta b$, it is desirable to be $\theta a = 0°$ and $\theta b = 180°$, namely, the first and second acceleration sensors 2, 3 are positioned on a line, which positional relation makes the distance R larger. When $\theta b$ is closed to $\theta a$, for example, $\Delta G$ is small, so that discrimination of $\Delta G$ is less. However, in such a case also, an angular rate can be detected.

As for $R_a$ and $R_b$, when $\theta a \neq \theta b$, the angular rate can be detected even if $R_a = R_b$.

Figure 4:
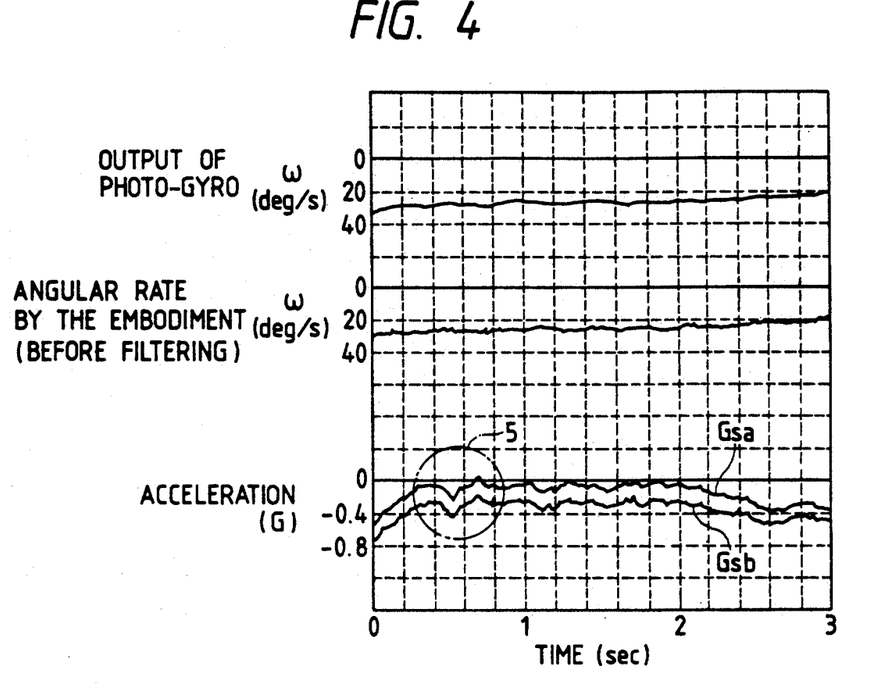
FIG. 4 is a graphical diagram showing angular rates detected by a conventional detector and an embodiment of the present invention, and detected acceleration.

FIG. 4 shows a comparison between detected values according to the present embodiment and conventional method when first and second acceleration sensors are mounted on an automobile to detect the values.

In FIG. 4, time is along the abscissa, and acceleration and angular rate are along the ordinate. As a comparative example, a conventional optical gyroscope is used which detects directly an angular rate. Comparison of an angular rate detected by the optical gyroscope with one obtained according to the present invention finds that both the angular rates have similar values.

In FIG. 4, detection acceleration $G_{sa}$, $G_{sb}$ also is acceleration $G_{sa}$, $G_{sb}$ has a small variation component therein, the small variation component of the acceleration influences the angular rate to produce variation components in the angular rate. If it is desired to remove these variation components, it can be achieved by a filter such as a low-pass filter. Further, when attention is given to a part 5 of the acceleration data in FIG. 4, it is found that acceleration in parallel movement is changed rapidly. However, the difference $\Delta G$ between $G_{sa}$ and $G_{sb}$ is not changed rapidly at a time of the rapid change of the angular rate.

Figure 5:
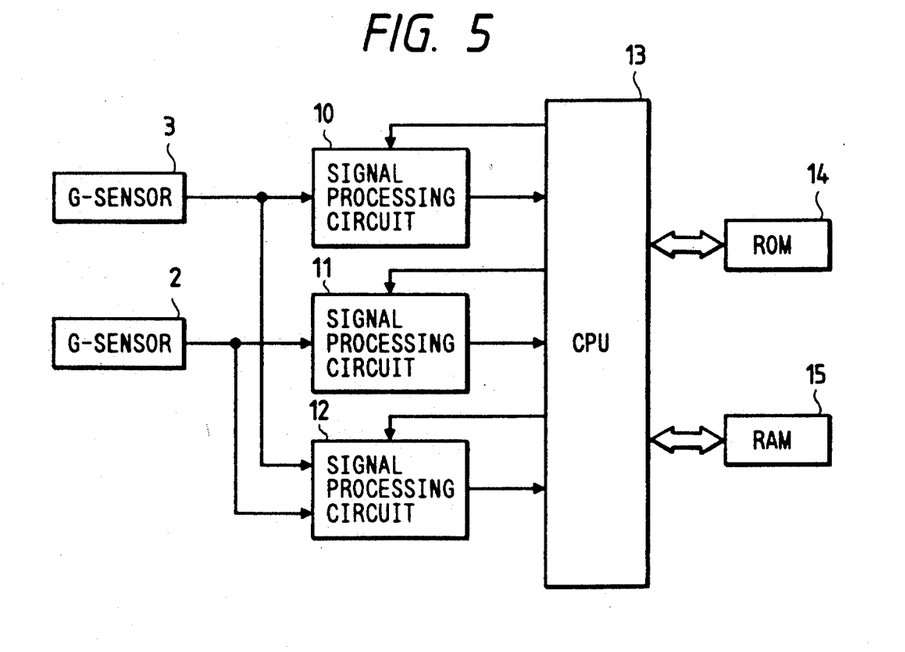
FIG. 5 is a block diagram of an embodiment of an angular rate detector.

Further, the processing circuit of the apparatus for detecting angular rate is described referring to a block diagram thereof in FIG. 5.

The processing circuit comprises signal processing circuits 10, 11, 12, CPU 13, ROM 14 and RAM 15. CPU 13, ROM 14 and RAM 15 constitute a computer, wherein CPU 13 effects an arithmetic operation and a control of the signal processing circuits 10, 11, 12. Software (OS) for carrying out the operation is stored in ROM 14. RAM 15 has a role of storing work data. Processing by the CPU 13 includes calculation of the equation (8) or (10) and processing for controlling the signal processing circuits 10, 11, 12.

Definitely, the CPU 13 carries out processing of change in time constant of filters of the signal processing circuits 10, 11 and sending of control instructions of the time constant result to the signal processing circuit 10, 11. The CPU 13 further effects processing for making zero offset of the acceleration difference G and sending of the result to the signal processing circuit 12.

Although the signal processing circuits 10, 11, 12 can be of analog or digital type, the circuit 10 has a function of filtration and amplification of output of the acceleration sensor 3, and the circuit 11 also has a function of filtration and amplification of output of the acceleration sensor 2. The signal processing circuit 12 receives outputs from the acceleration sensors 2, 3, filters each of them and obtains a difference therebetween and amplifies it. Further, the circuit 12 has a function of adjusting an offset of the output difference.

Filtering by the signal processing circuit 10, 11, 12 is effected to remove small variations appearing in $G_{sa}$, $G_{sb}$, as shown in FIG. 4. Namely, low-pass filtering is effected. In an analogue type filter, the CR time constant is changed. In an example described later, the resistance R is changed.

Amplification is effected to amplify outputs from the acceleration sensors 2, 3 because the outputs are very small in value. This is explained further referring to FIGS. 6 and 7.

Figure 6:
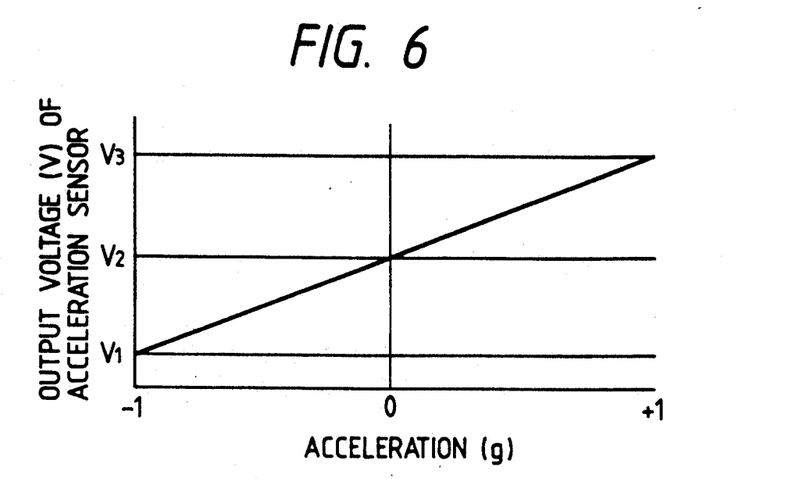
FIG. 6 is a graphical illustration showing a relationship between angular rate and acceleration to be measured.

In FIG. 6, a characteristic of output voltage and acceleration to be detected (g) in each acceleration sensor is illustrated. The characteristic is linear as expressed by a straight line. The acceleration sensor 2, 3 has a construction wherein, when acceleration g is 0, the sensor outputs a certain output voltage $V_2$. The sensor has polarity because the acceleration has a direction. The output voltage of the sensor is $V_1$ at the upper limit of the acceleration g and $V_3$ at the lower limit.

Figure 7:
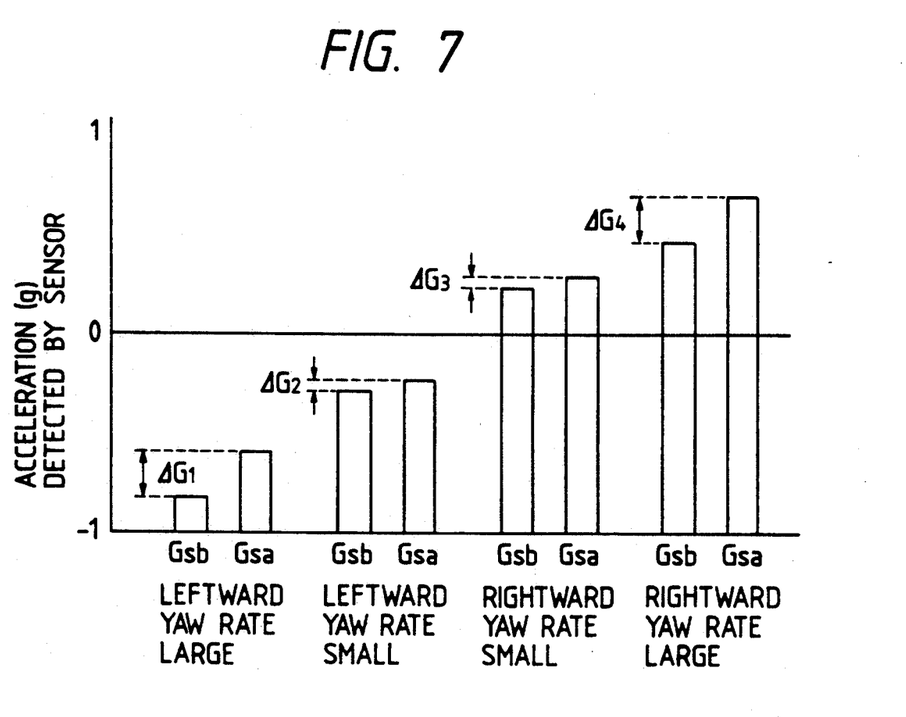
FIG. 7 is a graphical illustration showing each sensor output (acceleration) and an acceleration difference.

Output voltage $V_1$, $V_2$, $V_3$ of each acceleration sensor 2, 3 is in a range from several millivolts mV to several volts V. In case of the output of several volts V, it is not necessary to amplify it to a large extent, however, in case of several millivolt mV, it is desirable to amplify the output to a large extent. In particular, it is necessary for the signal processing circuit 12 to have an amplification function. The circuit 12 makes an acceleration difference $\Delta G$ from outputs of the acceleration sensor 2, 3. The acceleration difference is small. An example of the acceleration difference is shown in FIG. 7 in which yaw rate conditions also are shown. It is noted from FIG. 7 that $\Delta G_2$ and $\Delta G_3$ each are extremely small, compared with acceleration $G_{sb}$, $G_{sa}$ while $\Delta G_1$ and $\Delta G_4$ is not so small. Therefore, amplification of $\Delta G$ is desirable.

Adjustment of offset by the signal processing circuit 12 is effected for correction of variation in preciseness of each acceleration sensor 2, 3, and change in each sensor output with lapse of time. Characteristics of the acceleration sensors 2, 3 as shown in FIG. 6 are coincident with each other, then there is no problem. They, however, are sometimes not coincident.

In case the acceleration sensors 2, 3 are mounted on an automobile to detect a yaw rate, etc., for example, the acceleration sensors 2, 3 change in characteristics with time in a lifetime of the automobile, for example, over a period of 10 years. The change in characteristics is likely to take place because the acceleration sensors mounted on the automobile are continuously subjected to violent vibrations.

The signal processing circuit 12 adjusts the acceleration difference $\Delta G$ to be a constant offset value according to an instruction of the CPU 13. The adjustment of the offset should preferably be effected during stoppage of the automobile when the automobile angular rate is detected.

Further, the output of the acceleration sensors 2, 3 themselves are taken in the CPU 13 through the signal processing circuit 10, 11. The output, that is, the detected acceleration is used for various purposes, for example, detection of yaw rate direction as shown in FIG. 7.

According to the above embodiment of the present invention, an angular rate of the moving body 1 can be detected through detection of accelerations at different points A, B and calculation of an angular rate according to the equation (8) or (10). Further high-frequency components on an outputs of the acceleration sensors can be removed and an offset value can be kept constant.

Another embodiment of the present invention will be described hereunder referring to FIGS. 8 to 10.

Figure 8:
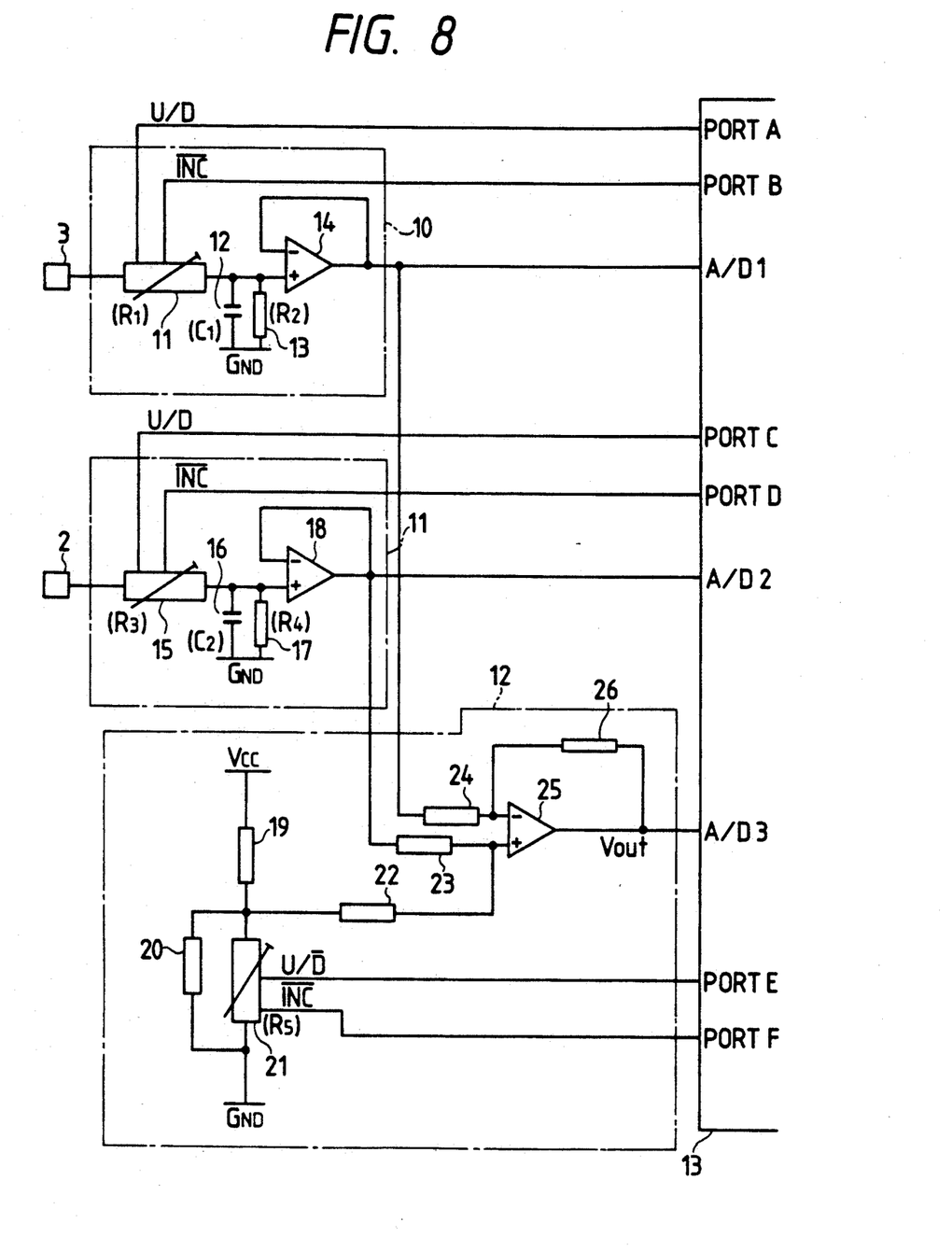
FIG. 8 is a block diagram of a signal processing circuit section of the angular rate detection apparatus.

In FIG. 8, a processing circuit is shown, and the processing circuit includes analogue type signal processing circuits 10, 11 and 12. The circuits 10, 11, 12 are similar to the one shown in FIG. 5, however, the circuit 12 differs from the one in FIG. 5 in that outputs from the acceleration sensors 2, 3 are not directly applied to the circuit 12 but taken in the circuit 12 through the signal processing circuits 10, 11. This construction has an advantage that the signal processing circuit 12 has no need to provide a filtration function.

In FIG. 8, the signal processing circuit 10 comprises a digital potentiometer 11, a CR filter 12, 13 and an operational amplifier 14. The signal processing circuit 11 also has the same construction as the signal processing circuit 10, that is, it comprises a digital potentiometer 15, CR filters 16, 17 and an operation amplifier 18. The signal processing circuit 12 comprises resistors 19, 20 which are elements for a potential divider, a digital potentiometer 21, input resistors 22, 23, 24, a differential amplifier 25 and a feedback resistor 26.

The digital potentiometers 11, 15, 21 can be changed in resistance value $R_1$, $R_2$, $R_5$ by the CPU 13. The potentiometers 11 and 15 are used for adjusting a resistance part of the CR filter and the potentiometer 21 is used for making an offset value constant.

The potentiometers 11, 15, 21 each are adjusted in the same manner. Namely, when an INC (increment) terminal is instructed to be high and a U/D terminal to be D, the resistance of the potentiometer is decremented. When the INC terminal is high and the U/D terminal is instructed to be U, the resistance of the potentiometer is incremented. The instructions H, U and D are provided by CPU 13.

The time constant of the filter is changed by the potentiometer 11, 15. When an automobile having acceleration sensors 2, 3 mounted thereon, for example, runs on an uneven load, outputs of the acceleration sensors 2, 3 have various frequencies as noises because of swing of the automobile. When the CPU detects such conditions, the filter characteristic changing is used for removing the noise components, for example, when violent vibrations take place due to the uneven load, the time constant is made larger, thereby to remove influence of hunting caused by the automobile vibration.

According to FIG. 8, the signal processing circuits 10, 12 output signals from which noises are removed from output of the acceleration sensors. The signals are inputted directly into the CPU 13. Further, the signals are inputted into the signal processing circuit 12 to obtain a difference therebetween and amplify it. The amplified difference is inputted into the CPU to calculate angular rate $\omega$. The circuit 12 controls the offset value to be constant, so that the result is not influenced badly by variations in preciseness of the acceleration sensors 2, 3.

Figure 9:
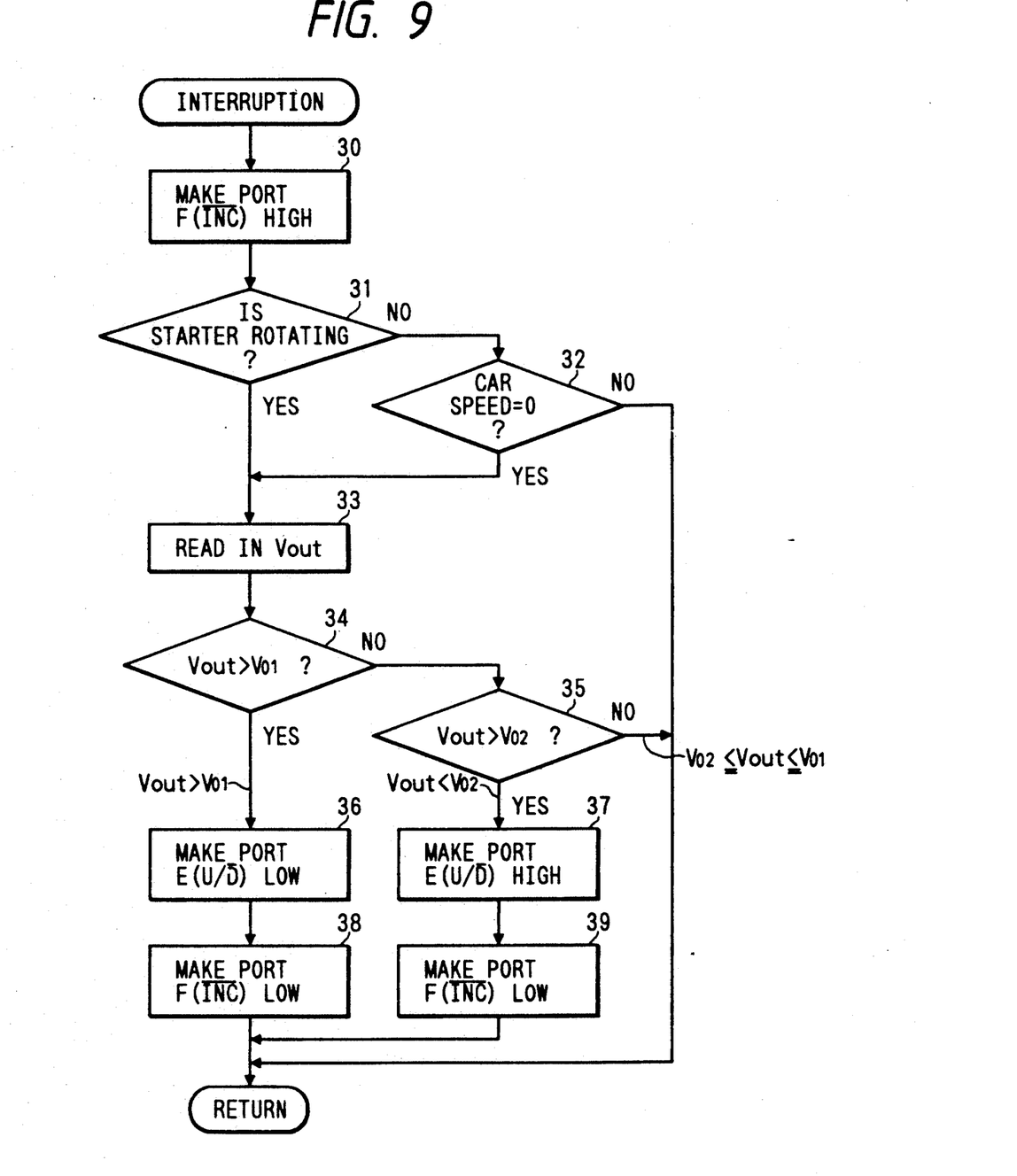
FIG. 9 is a flow chart for explaining an operation of setting an offset value.
Figure 10:
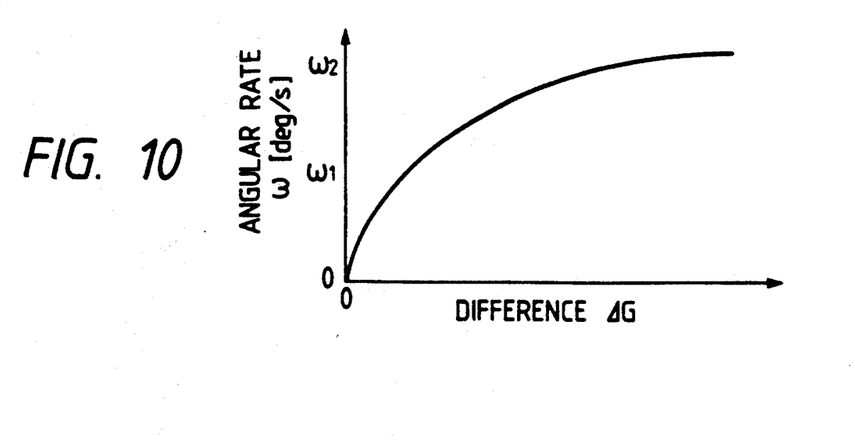
FIG. 10 is a graphical illustration of a map of a relationship between acceleration difference and angular rate.

An example of a control to make the offset value constant is explained referring to FIG. 9, which is a flow chart of operations for processing a constant offset value by CPU 13, taking an automobile as an example.

The processing is started by interruption.

First of all, a port F is made high in step 30. Next, it is checked whether or not a starter is rotating in step 31. When the starter is not rotating, it is checked whether or not the car speed is 0 in step 32. In this case, when the car speed is not 0, the processing is returned, because a car speed which is not zero means that the car is running, and the value in such a case can not be used as an initial value. When the starter is rotating and the car speed is zero, an amplified difference output $V_{out}$ in the signal processing circuit 12 is read into CPU 13 at step 33. The output is checked to see whether or not it is larger than a predetermined value $V_{01}$ in step 34, and when the output $V_{out}$ is larger than the predetermined value $V_{01}$, the port E is made low in step 16 and the port F is made low in step 38 whereby the resistance of the potentiometer 21 is decremented. When the amplified difference output $V_{out}$ is judged to be smaller than another predetermined value $V_{02}$ which is smaller than $V_{01}$ ($V_{01} > V_{02}$) in step 35, the resistance of the potentiometer 21 is incremented by making the port E high in step 37 and by making the port F low in step 39. In step 35, the amplified difference output $V_{out}$ is not smaller than the predetermined value $V_{02}$, that is, when $V_{02} \leq V_{out} \leq V_{01}$, it is thought that the offset value is proper, and the offset control is completed.

Decrementing of the resistance of the potentiometer 21 in steps 36, 38 or incrementing of the resistance in steps 37, 39 are repeated at each time of the interruption, for example, 10 msec, until the condition $V_{02} \leq V_{out} \leq V_{01}$ is satisfied. In this case, U/D takes two values, Low and High. In order to coincide U/D with FIG. 8, "U" means Low and "D" means High.

Assuming that $V_{01} - V_{02} = \epsilon$ (allowable error), a value of $\epsilon$ determines magnitude of error in the amplified difference output. That is, the larger the value $\epsilon$, the larger the error.

The arithmetic operation itself of the equation (8) or (10) is not described. The equation (8) or (10) can be calculated directly, or a relationship between the acceleration difference $\Delta G$ and an angular rate corresponding thereto can be stored in a map table as shown in FIG. 10 and the corresponding angular rate $\omega i$ can be obtained from $\Delta Gi$.

Figure 11A:
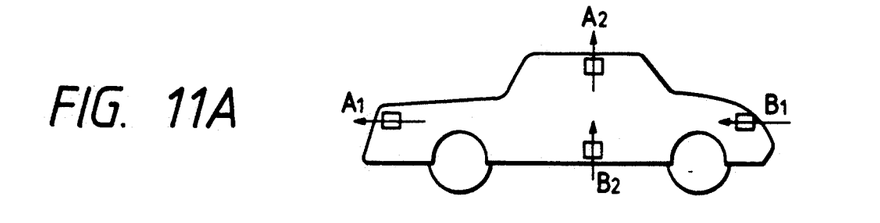
FIGS. 11A to 11C each are a schematic diagram showing arrangements of acceleration sensors on an automobile.
Figure 11B:
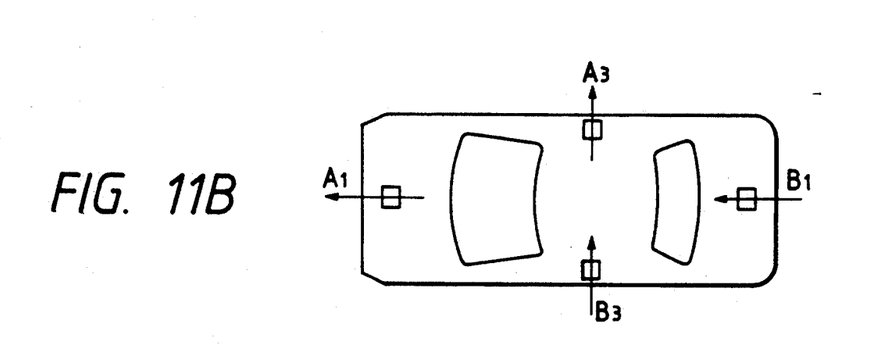
Figure 11C:
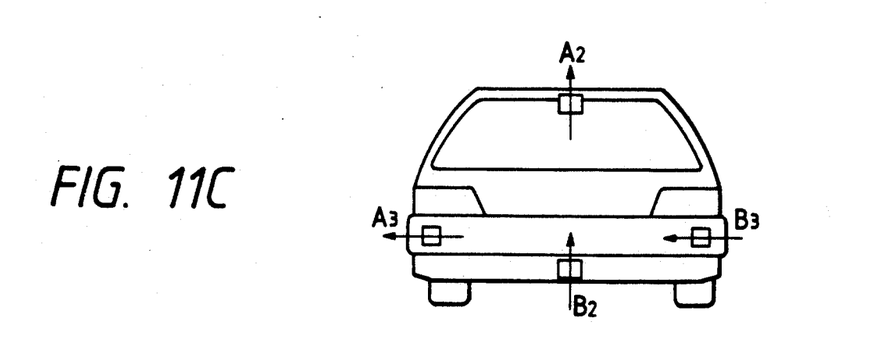

Examples in which acceleration sensors are mounted on an automobile are shown in FIGS. 11A, 11B and 11C. Each of the examples have two pairs of the acceleration sensors. In FIG. 11A, the acceleration sensors $A_1$, $B_1$ are mounted on front and rear portions of the automobile, respectively. The acceleration sensors $A_2$, $B_2$ are mounted on a roof and a floor of the automobile, respectively. Any of the pairs of the acceleration sensors $A_1$, $B_1$; $A_2$, $B_2$ can detect a pitch rate of the automobile. Assuming that a forward and backward direction of the automobile is an x-direction in a x-y plane parallel to the ground, the pitch means rotation around a y-axis perpendicular to the x axis.

In order to calculate a pitch rate, a difference between outputs of the acceleration sensors $A_1$, $B_1$ is detected and then the pitch rate is calculated, based on the difference and a distance between the acceleration sensors $A_1$, $B_1$. In a similar manner, the pitch rate also can be obtained using output difference of the acceleration sensors $A_2$, $B_2$ and a positional distance between the acceleration sensors $A_2$, $B_2$ and according to the equation (8) or (10).

In FIG. 11B, examples of an arrangement of the pair of acceleration sensors $A_1$, $B_1$ and a pair of acceleration sensors $A_3$, $B_3$ for obtaining a yaw rate of an automobile are shown. Each pair of the sensor $A_1$, $B_1$; $A_3$, $B_3$ can detect a yaw rate. In FIG. 11B, the sensors $A_3$, $B_3$ are mounted on sides of the automobile, respectively. Yaw rate refers to rotational angular rate around a z axis perpendicular to the x-y plane, which is the running ground. A method of calculation for obtaining the yaw rate is similar to the method of obtaining the pitch rate.

FIG. 11C shows an example of an arrangement of acceleration sensors for obtaining a roll rate. The acceleration sensors $A_2$, $B_2$ have a similar arrangement to sensors $A_2$, $B_2$ in FIG. 11A. Namely they are mounted on the roof and the floor of the automobile so that a detection direction of acceleration is vertical. Another pair of acceleration sensors $A_3$, $B_3$ also are arranged on the automobile in a similar fashion to sensors $A_3$, $B_3$ in FIG. 11B, that is they are mounted on the sides of the automobile so that the acceleration detection directions are the same. Each pair of the acceleration sensors can detect a roll rate. The roll rate is rotational angular rate around a y axis which is parallel to a running direction of the automobile. The arithmetic operation for obtaining the angular rate, that is, the roll rate around the y axis is effected according to the equation (8) or (10).

In an automobile, the acceleration sensors should not be mounted on moving parts such as doors, because the detection direction will not be fixed, but will change with lapsed time and change in the mounting positions of the parts on which the acceleration sensors are mounted. It is desirable to mount the acceleration sensors on a chassis of the automobile.

Figure 12:
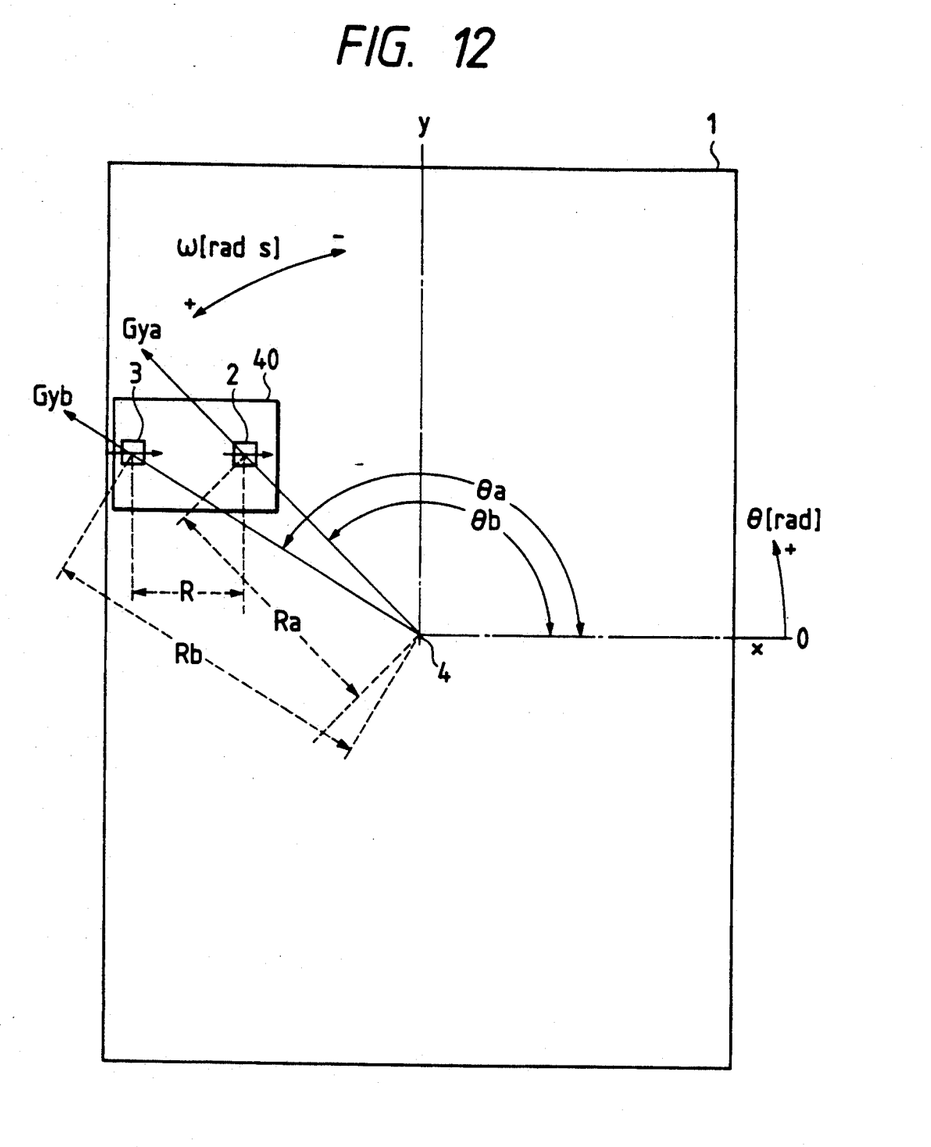
FIG. 12 is a diagrammatic view of an arrangement of acceleration sensors on a controller of an automobile.
Figure 13A:
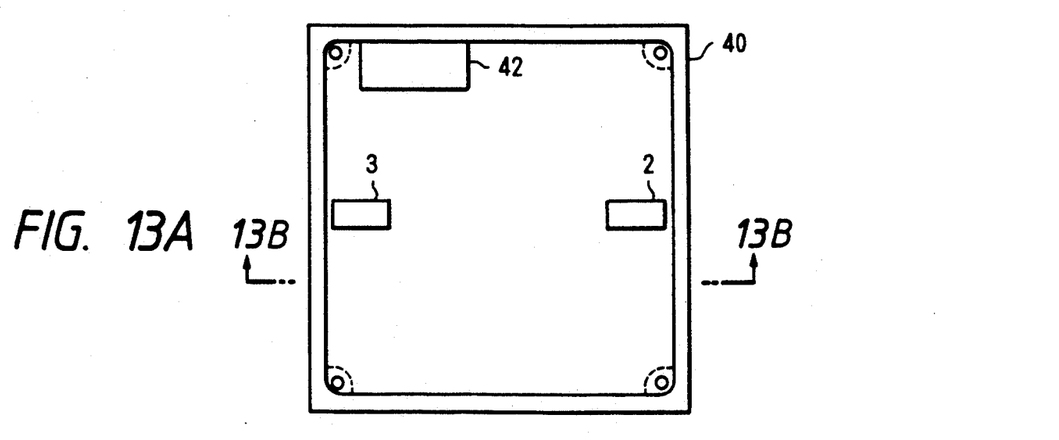
FIG. 13A is a plane view of the controller.
Figure 13B:
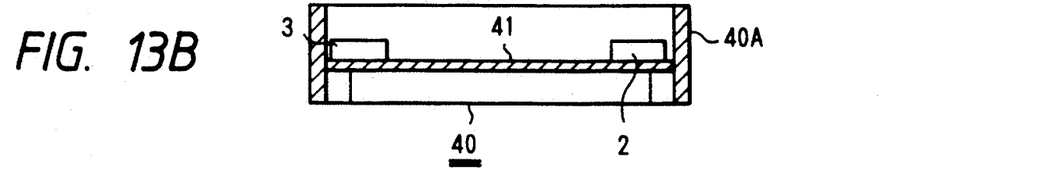
FIG. 13B is a sectional view taken along a line 13B—13B of FIG. 13A.

An example in which acceleration sensors 2, 3 are mounted on a control apparatus of an automobile 1 is shown in FIG. 12. Here, the control apparatus includes one of any control apparatus, such as a fuel controller, ignition controller, automatic cruising apparatus, etc. In FIG. 12, the control apparatus 40 comprises a printed substrate 41 which is mounted horizontally on a part of the automobile, such as a part of a front section of the automobile. As shown in FIGS. 13a, 13b, the controller 40 comprises the printed substrate 41, an outer casing 40A surrounding the substrate 41 to protect the substrate from being subjected to external mechanical force, and a connector for an outer interface. The substrate 41 has various kinds of IC, LSI elements mounted thereon. The acceleration sensors 2, 3 are mounted on a space of the substrate in which the elements are not arranged so that the distance between the sensors 2, 3 is as large as possible.

In this arrangement of the acceleration sensors 2, 3, angle $\theta a$ is relatively close to angle $\theta b$ as compared with one shown in FIG. 1. Therefore, an output difference from the acceleration sensor 2, 3 used for calculation of angular rate is small, so that it is preferable to provide amplifying means.

Figure 14:
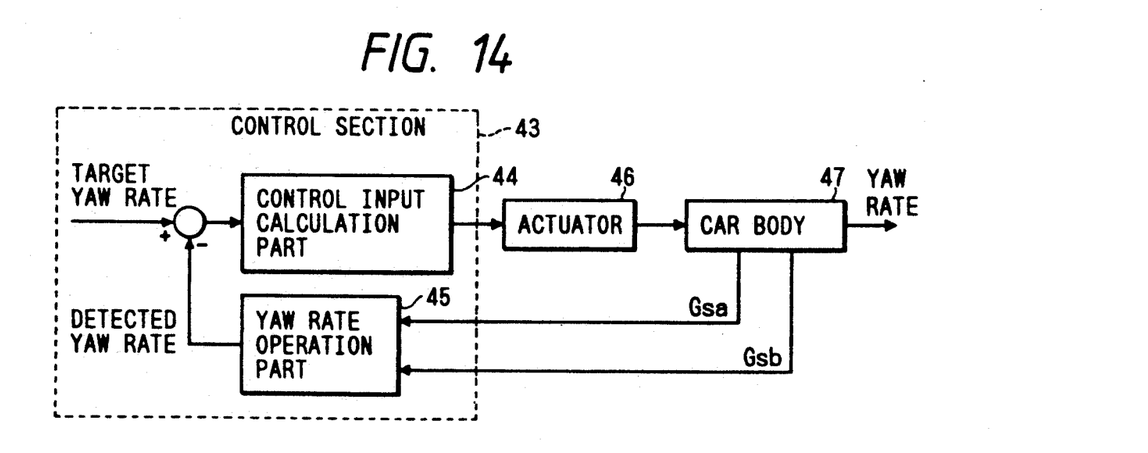
FIG. 14 is a block diagram of an embodiment of a control apparatus for an automobile according to the present invention.

Referring to FIG. 14, a control apparatus employing the angular rate detection apparatus according to the invention will be described hereunder in detail.

As for a control employing a yaw rate, there is an anti-skid brake control apparatus and a 4-wheel steering control apparatus. The anti-skid brake control apparatus prevents locking of the wheel and suppresses occurrence of yaw which is not intended by a driver, using a detected yaw rate. The 4-wheel steering control apparatus controls rear wheels of an automobile so that detected yaw rate reaches a target value. The control apparatus is shown in FIG. 14, and includes a control section 43 comprising a control input calculation part 44 and a yaw rate arithmetic operation part 45, and an actuator 46. In this control apparatus, acceleration sensors (not shown) mounted on a car body 47 output acceleration outputs $G_{sa}$, $G_{sb}$ detected thereby. The acceleration outputs, $G_{sa}$, $G_{sb}$ are inputted into the yaw rate arithmetic operation part 45 to calculate a yaw rate of the car body. The yaw rate is compared with a target yaw rate to obtain a difference. The control input calculation part 44 calculates a control input according to the difference and outputs a control input. The actuator 46 actuates brakes in the anti-skid brake control apparatus according to the control input from the control input calculation part 44, and rear wheels in the 4-wheel steering control apparatus thereby to control movement of the car body. The operation is repeated, whereby the yaw rate approaches the target yaw rate.

The arrangement of the acceleration sensors 2 and 3 on a moving body 1 according to the present invention enables detection of acceleration of the moving body 1 in a specific direction other than detection of angular rate.

This is explained referring to FIG. 1. Here, acceleration of parallel movement of the moving body 1 at the center of gravity thereof is obtained with a high preciseness. Assuming that acceleration at the center of gravity is $G_c$. The acceleration $G_c$ is given as follows:

$$G_c = G_{la} = G_{lb} \tag{11}$$

The acceleration is expressed as follows by converting the equation (11) using the equation (1):

$$G_c = G_{sa} - G_{ya} \cos \theta a \tag{12}$$

Here, $G_{ya} = R_a \omega^2$. The equation (12) is converted as follows using the equation (12):

$$G_c = G_{sa} - \frac{G_{sa} - G_{sb}}{R_a \cos \theta a - R_b \cos \theta b} \cdot R_a \cos \theta \tag{13}$$

The equation (13) is simplified as follows:

$$G_s = \frac{R_a G_{sb} \cos \theta a - R_b G_{sa} \cos \theta}{R_a \cos \theta a - R_b \cos \theta b} \tag{14}$$

According to the equation (14), acceleration due to centrifugal force of rotational movement of the moving body is cancelled, and parallel acceleration at the center 4 of gravity can be obtained.

The above-mentioned signal processing circuits are of analogue type, however, digital circuits can be used for the same purpose. As for the filtering devices and the amplifier, digital filters and amplifiers also can be used.

A digital signal processor can be used for the electric computer.

Correction of the offset value of the acceleration difference, that is, zero-point adjustment of the acceleration difference is effected, however, zero-point adjustment of the output itself of each acceleration sensor can be carried out.

A typical example of a moving body, concerning the invention is an automobile, and one of the other examples is a video camera. The video camera shakes by hand. The angular rate of the movement of the video camera by hand can be detected.

In the above embodiment of the invention, two acceleration sensors are arranged in the same detection direction, however, even if the acceleration sensors are arranged in a slightly different direction from each other, an angular rate can be detected.

Detected angular rate can be used for a control of a traction control other than the anti-skid brake controller, and the 4-wheel steering controller.

According to the invention, at least two acceleration sensors are fixed to a moving body whereby parallel acceleration in parallel movement of the moving body, which movement includes rotational movement and parallel movement, can be measured. Further, an angular rate also can be measured without being influenced by the parallel acceleration.

The acceleration sensors used for the angular rate detection apparatus are very simple in construction as non-contact type, compared with a conventional optical gyroscope, vibration gyroscope, etc. so that the angular rate detection apparatus can be provided at low cost.

The acceleration sensor itself has a smaller size than the other angular rate sensors, so that the acceleration sensor can be easily incorporated into a hand held video camera, so that angular rate of shaking of the camera by hand can be detected.

During stoppage of a moving body to be measured, zero-point adjustment of the angular rate detection apparatus is effected, so that even if an offset is caused by change with lapsed time in the acceleration sensors, a precise angular rate can be measured without being influenced thereby.

Further, a difference of output voltage from the acceleration sensors is amplified, whereby preciseness of an angular rate detected can be raised even if the apparatus has a limited resolution in A/D conversion.

A difference between outputs of the acceleration sensors is calculated after each output is filtered by hard or soft filters, so that a calculated angular rate can not be influenced by high frequency noises.

By making the time constant of the above-mentioned filters variable, a hunting in the output from the angular rate detection apparatus can be suppressed under bad conditions in which the apparatus is mounted on an automobile running an uneven load.

Further, when the acceleration sensors for the angular rate detection sensor are mounted a control apparatus mounted on an automobile such as an anti-skid brake control apparatus, 4-wheel steering control apparatus, each, harness can be omitted and electromagnetic noises can be reduced to enter the apparatus.

By using the angular rate detection apparatus for a feed back control of automobile yaw, the safety of the automobile, that is, safety of steering can be raised.

Further, in case the acceleration sensors are mounted in a plane parallel to a floor of an automobile, when the two acceleration sensors are mounted on the front and rear parts in a line with each other or when they are mounted laterally to the front and rear direction, gravity center acceleration in a forward and backward direction of the automobile or a gravity center acceleration in the lateral direction can be detected as well as a yaw rate of the automobile at the same time.

Further, by a prescribed operation of outputs from two acceleration sensors mounted on a moving body to cancel an acceleration component in a centrifugal force direction, a parallel acceleration component of the moving body can be precisely detected.

What is claimed is

1. An apparatus for detecting an angular rate of a moving body, comprising:
    first and second acceleration sensors each having a detection direction;
    means for mounting said first and second acceleration sensors on said moving body so that said first and second acceleration sensors have substantially the same detection direction on a plane and a fixed distance therebetween in the detection direction; and
    means for detecting an angular rate of the moving body around an axis perpendicular to the plane on which said first and second acceleration sensors are disposed, on the basis of outputs of and a positional relation between said first and second acceleration sensors.

2. The apparatus according to claim 1, wherein said means for detecting angular rate calculates the angular rate ($\epsilon$) of said moving body according to the following equation:

$$\epsilon = \sqrt{\frac{\Delta G}{R}}$$

wherein $\Delta G$ is a difference between acceleration detected by said first acceleration sensor and acceleration detected by said second acceleration sensor, and R, said distance between said first and second acceleration sensors in the detection direction.

3. The apparatus according to claim 1, wherein said means for detecting angular rate includes means for adjusting zero point of the difference between outputs from said first and second acceleration sensors, zero point adjustment by said correction means being effected during stoppage of the moving body.

4. The apparatus according to claim 1, wherein said means for detecting angular rate including filtering means for effecting low-pass filtering of an output of each of said first and second acceleration sensor and means for calculating a difference between the outputs having passed through said filtering means.

5. An apparatus for detecting an angular rate of an automobile, comprising:
    first and second acceleration sensors each having a detection direction;
    means for mounting said first and second acceleration sensors on a car body of said automobile so as to position on a plane substantially parallel to floor of said automobile, said detection direction being substantially the same as each other and said first acceleration sensor being separated from said second acceleration sensor to provide a distance (R) therebetween with respect to the detection direction;
    means for detecting an angular rate ($\epsilon$) of movement of said automobile around an axis perpendicular to said plane on the basis of a difference ($\Delta G$) between outputs from said first and second sensors and the distance (R) along the following relation:

$$\epsilon = \sqrt{\Delta G/R} \ .$$

6. The apparatus according to claim 5, wherein said first and second acceleration sensors are mounted front and rear portions of said automobile, respectively.

7. The apparatus according to claim 6, wherein said detected angular rate is a yaw rate of said automobile, said first and second acceleration sensors being mounted on a forward portion and backward portion of said automobile, respectively.

8. The apparatus according to claim 6, wherein zero-point adjustment means are provided for adjusting of a difference between outputs from said first and second sensors during stoppage of said automobile to zero.

9. The apparatus according to claim 6, wherein said means for detecting an angular rate includes means for filtering outputs from said first and second acceleration sensors to pass low frequency components in the outputs.

10. The apparatus according to claim 9, wherein frequency characteristics of said means for filtering is changeable in response to conditions under which said automobile travels.

11. The apparatus according to claim 6, wherein said first and second acceleration sensors are mounted on a substrate of one of control apparatus.

12. An apparatus detecting a physical quantity of movement of a moving body which includes parallel movement on a plane and a rotational movement around an axis perpendicular to the plane, said apparatus comprising;
   first and second acceleration sensors each having a detection direction;
   means for mounting said first and second acceleration sensors on said moving body so as to be positioned in said plane with a fixed distance (R) between said first and second acceleration sensors in the detection direction; and
   means for calculating physical quantity representative of one of an angular rate of said rotational movement and acceleration of said parallel movement of said moving body, on the basis of a difference between outputs from said first and second acceleration sensors and said distance (R) between said first and second acceleration sensors with respect to the detection direction.

13. The apparatus according to claim 12, wherein said means detecting a physical quantity includes filtering means for filtering the outputs from said first and second acceleration sensors.

14. The apparatus according to claim 12, wherein the calculated acceleration is acceleration of the parallel movement of said moving body at the center of gravity thereof.

15. A control apparatus for controlling movement of a moving body, comprising;
   first and second acceleration sensors each having a detection direction and outputting an output corresponding to detected acceleration;
   means for fixing said first and second acceleration sensors on said moving body so as to position in a plane of said moving body with a distance (R) between said first and second acceleration sensors in the detection direction;
   means for detecting an angular rate ($\epsilon$) of said moving body around an axis perpendicular to said plane of said moving body according to an equation $\epsilon = \sqrt{\Delta G/R}$, wherein $\Delta G$ is a difference between the outputs from said first and second acceleration sensors;
   a comparator for comparing a target angular rate of said moving body and the detected angular rate to produce a difference;
   means for generating a control input corresponding to said difference between said target angular rate and said detected angular rate; and
   an actuator mounted on said moving body for actuating a control element in response to the control input so that an angular rate of said moving body approaches to the target value.

* * * * *